United States Patent
De Jong et al.

(10) Patent No.: US 11,137,639 B2
(45) Date of Patent: Oct. 5, 2021

(54) OPTICAL DEVICE COMPRISING A SWITCHABLE LAYER AND AT LEAST ONE OPTICAL LAYER

(71) Applicant: MERCK PATENT GMBH, Darmstadt (DE)

(72) Inventors: Ties De Jong, Utrecht (NL); Casper Van Oosten, Waalre (NL)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 16/612,235

(22) PCT Filed: May 8, 2018

(86) PCT No.: PCT/EP2018/061797
§ 371 (c)(1),
(2) Date: Nov. 8, 2019

(87) PCT Pub. No.: WO2018/206545
PCT Pub. Date: Nov. 15, 2018

(65) Prior Publication Data
US 2021/0116748 A1  Apr. 22, 2021

(30) Foreign Application Priority Data
May 9, 2017 (EP) .................................. 17170278

(51) Int. Cl.
*G02F 1/1335* (2006.01)
*G02F 1/13363* (2006.01)
(Continued)

(52) U.S. Cl.
CPC .... *G02F 1/133553* (2013.01); *G02F 1/13725* (2013.01); *G02F 1/133638* (2021.01); *G02F 1/155* (2013.01)

(58) Field of Classification Search
None
See application file for complete search history.

(56) References Cited

U.S. PATENT DOCUMENTS 5,940,150 A * 8/1999 Faris ................... C09B 67/0098
349/16
6,055,088 A * 4/2000 Fix .......................... B32B 17/10
359/265

(Continued)

FOREIGN PATENT DOCUMENTS

JP         58095327 A    6/1983
WO       09141295 A1    11/2009

OTHER PUBLICATIONS

R. Baetens et al.: "Properties, requirements and possibilities of smart windows for dynamic daylight and solar energy control in buildings: A state-of-the-art review", Solar Energy Materials & Solar Cells, vol. 94, 2010, pp. 87-105, XP026815508.

(Continued)

*Primary Examiner* — Ryan Crockett
(74) *Attorney, Agent, or Firm* — Millen, White, Zelaon & Branigan, P.C.

(57) ABSTRACT

The invention relates to a switchable optical device (10) having a layer structure comprising at least one switchable layer (15) and at least one optical layer (20, 22). The at least one switchable layer (15) comprises a liquid-crystalline material and at least one dye. The at least one optical layer (20, 22) has at least one reflection band (32) which includes at least a first part of the visible spectrum and has at least one transmission band (30, 34) which includes at least a second part of the visible spectrum. The absorption spectrum of the at least one switchable layer (15) is adjusted by means of the at least one dye such that the light transmission through the switchable optical device (10) for incident light in the visible (Continued)

light spectrum for at least one of the states of the switchable layer (15) is set to a predetermined transmission spectrum.

12 Claims, 6 Drawing Sheets

(51) Int. Cl.
    *G02F 1/137*    (2006.01)
    *G02F 1/155*    (2006.01)

(56) References Cited

U.S. PATENT DOCUMENTS

| | | |
|---|---|---|
| 8,927,856 B2 | 1/2015 | Debije et al. |
| 10,545,346 B2 * | 1/2020 | Waldern ............. G02B 27/0172 |
| 2002/0085151 A1 * | 7/2002 | Faris ................. G02F 1/133621 |
| | | 349/117 |
| 2005/0007505 A1 * | 1/2005 | Faris .................. C09B 67/0098 |
| | | 349/16 |
| 2015/0109651 A1 * | 4/2015 | Branda ............ B29D 11/00634 |
| | | 359/238 |
| 2016/0257885 A1 * | 9/2016 | Junge ........................ E06B 9/24 |

OTHER PUBLICATIONS

International Search report WO2018EP61797 dated May 8, 2018.

* cited by examiner

OPTICAL DEVICE COMPRISING A SWITCHABLE LAYER AND AT LEAST ONE OPTICAL LAYER

The invention relates to an optical device having a layer structure comprising a switchable layer having at least two states and at least one optical layer, wherein the switchable layer comprises a liquid-crystalline material and at least one dye. Further aspects of the invention relate to a switchable window comprising such an optical device and the use of the switchable window.

The review article by R. Baetens et al. "Properties, requirements and possibilities of smart windows for dynamic daylight and solar energy control in buildings: A state-of-the-art review", Solar Energy Materials & Solar Cells 94 (2010) pages 87-105, describes tintable smart windows. Smart windows can make use of several technologies for modulating the transmittance of light such as devices based on electrochromism, liquid crystal devices and electrophoretic or suspended-particle devices. Liquid crystal based devices employ a change in the orientation of liquid crystal molecules between two conductive electrodes by applying an electric field which results in a change of their transmittance.

WO 2009/141295 A1 discloses an optical device having a switchable layer, at least one alignment layer and a light guiding system which is in contact with a light-energy converting means. The switchable layer comprises a luminescent material. In one embodiment a liquid crystal is used as the switchable layer and the liquid crystal dissolves and aligns the luminescent material in a guest-host system. The luminescent material exhibits dichroism such that the luminescent material has a strong absorption along a first axis and in any other axis the absorption is lower. The optical properties of the optical device depend on the alignment of the luminescent material. The optical device is in a transmitting state if the absorption axis of the luminescent material is aligned perpendicular to the main extension of the plane of the switchable layer and the optical device is in an absorbing state if the absorption axis is aligned parallel to the main extension plane of the switchable layer. For switching between the states a polyimide layer with electrodes is used as alignment layer and a first electrical signal brings the switchable layer in the transmitting state, and the application of a second electrical signals brings the switchable layer in the absorption state.

The outside appearance of windows is to a large extent determined by the reflection of light from the window. For architectural purposes, it is desirable to control this reflection, such that a building can have an appearance of a certain color. At the same time, the transmitted spectrum of a window has different demands. The transmission spectrum of a window should preferably be color neutral. Color neutrality may be defined using a color rendering index wherein the light spectrum is compared to a reference light source.

It is an object of the invention to provide a switchable optical device wherein the reflective and transmissive properties of the device can be controlled simultaneously, and independently of each other.

A switchable optical device having a layer structure comprising at least one switchable layer and at least one optical layer is proposed. The at least one switchable layer comprises a liquid-crystalline material and at least one dye. The at least one optical layer has at least one reflection band which includes at least a first part of the visible spectrum and has at least one transmission band which includes at least a second part of the visible spectrum. The absorption spectrum of the at least one switchable layer is adjusted by means of the at least one dye such that the light transmission through the switchable optical device for incident light in the visible spectrum is set to a predetermined transmission spectrum for at least one of the states of the switchable layer.

Preferably, the at least one switchable layer of the proposed switchable optical device has at least two states wherein each state has different light propagation properties. One of the states is a bright state in which only little absorption and/or scattering of light occurs. A further state of the switchable layer is a dark state in which absorption and/or scattering of light occurs. The state of the switchable layer is preferably controlled using an electric field. By changing the state, the appearance of the switchable optical element is changed. A dark state is defined as a state in which the amount of light transmitted through the switchable optical element is less than in the bright state.

Preferably, the at least one dye is chosen such that the transmission spectrum of the switchable optical device is color neutral for the visible light spectrum for at least one of the states of the switchable layer. In order to achieve such a color neutral transmission, the absorption spectrum of the at least one dye is preferably adjusted to be complementary to the at least one transmission band of the at least one optical layer.

An outside appearance of the switchable optical element is determined by the reflection of incident light in the visible spectral range and an inside appearance of the switchable optical element is determined by the transmission and/or reflection of incident light in the visible spectral range. The visible spectral range is from 380 to 780 nm. If the switchable optical element is used as a window, the side facing outside is defined with respect of the switchable optical element being used as a window in a building or vehicle. Otherwise, for example in a testing environment, the surface of the optical element which is facing the respective light source is defined as outer surface and the surface of the optical element facing away from the light source is defined as inner surface.

The outside appearance is controlled by choosing the at least one reflection band and the at least one transmission band of the at least one optical layer of the switchable optical element such that light of the desired color is reflected. If, for example, a green outside appearance is desired, the reflection band is chosen such that the light of a wavelength of between 500 and 600 nm is reflected and visible light in the wavelength ranges of between 380 to 500 nm and 600 to 780 nm is transmitted. Preferably, light having a wavelength within one of the at least one reflection bands is only partially reflected.

In the following, the strength of reflection $R(\lambda)$ of a surface, such as the optical layer, at a particular wavelength $\lambda$ or in a particular wavelength range, is defined as the ratio of the intensity of reflected light and the intensity of the incident light, wherein the angle of incidence, which is measured against the normal of the plane is 0°. Likewise, the transmission $T(\lambda)$ through a structure is defined as the ratio of the intensity of the transmitted light and the intensity of the incident light, wherein the angle of incidence, which is measured against the normal of the plane is 0°.

Preferably, the switchable optical device comprises at least one reflection layer which may be included as the at least one optical layer or as one layer of at least two optical layers. Preferably, the at least one optical layer having at least one reflection band which includes at least a first part of the visible spectrum and having at least one transmission band which includes at least a second part of the visible spectrum, is a reflective layer.

Preferably, the strength of reflection R(λ) of the at least one optical layer for light having a wavelength within the at least one reflection band, is at least 2%. Especially preferred the strength of reflection is at least 5%, more preferred at least 10%.

In order to achieve a color neutral light transmission, it is preferred that the at least one optical layer may not reflect the entire incident light in the at least one reflection band. It is preferred that the at least one optical layer reflects less than 70% of the incident light with a wavelength in the at least one reflection band. Preferably, less than 60% and most preferred less than 50% of the incident light with a wavelength in the at least one reflection band is reflected.

Alternatively or additionally, in order to achieve color neutral transmission even in cases wherein light having a wavelength within the reflection band is completely or nearly completely reflected, a luminescent dye may be used. The luminescent dye can absorb light having a wavelength within the at least one transmission band which is then re-emitted at a wavelength within the reflection band.

The amount of transmitted light is influenced by the switchable layer and is dependent on the state of the switchable layer. A contrast C of the switchable optical device in transmission between the bright state and the dark state of the switchable layer for a given wavelength λ is defined as $$C(\lambda) = (1 - R(\lambda)) \cdot (T_B(\lambda) - T_D(\lambda)) \quad (1)$$

wherein C(λ) is the contrast for light with a wavelength λ, R(λ) (strength of reflection as defined above) is the lost intensity due to reflections for light with wavelength λ, $T_B(\lambda)$ and $T_D(\lambda)$ (strength of transmission as defined above) is the transmission of light with wavelength λ for the bright state and for the dark state, respectively. The strength of reflection and the transmission are given as a dimensionless number between 0 and 1. The reflection losses include the reflection at the at least one optical layer as well as the reflection at all other layers of the switchable optical device.

For assessing the contrast C, the function C(λ) is averaged over the spectral range of the visible light spectrum. Preferably, the contrast C obtained by averaging the function C(λ) over the visible spectrum is at least 0.5.

For example, if for a given wavelength the reflection losses R are 0.2 (20%) and the transmission of the switchable layer in the bright state is 0.74 (74%) and in the dark state is 0.15 (15%), then the contrast C is 0.47 (47%). If for the same situation the reflection losses are reduced to 0.1 (10%), then the contrast C increases to 0.53 (53%). Thus, for achieving a high contrast between the bright state and a dark state, the losses due to reflection should be minimized.

It is thus preferred that the optical layer has a light transmission T(λ) for wavelength in the at least one transmission band of at least 90%, preferably at least 95% and most preferred of at least 98%.

In order to reduce reflection losses the optical device may include at least one anti-reflection layer. The anti-reflection layer is preferably a broadband anti-reflection coating which reduces the reflectivity of a surface of the switchable optical device in the visible spectral range. The anti-reflection layer may be included as one of the optical layers in addition to the at least one optical layer.

Anti-reflection layers can be made from one or more highly transparent thin layers comprising materials with low refractive index. Preferably, the thickness and the refractive index of such anti-reflection layer conform to the following equation, where n is the refractive index of the material of the anti-reflection layer, d is the thickness of the anti-reflection layer, and λ is the wavelength of minimum reflectivity:

$$n * d = \lambda/4$$

Preferably, λ in this case marks the center of the band of low reflectivity (transmission band). Such layers are, due to the equation above, termed quarter-lambda layers.

By modifying the thickness of the anti-reflection layer, according to the equation above, the wavelength of lowest reflection can be shifted to lower wavelengths (by decreasing the thickness), or to higher wavelengths (by increasing the thickness).

Examples of suitable anti-reflection layers are layers of $MgF_2$ having a thickness of, for example, 100 nm (having a minimum of reflectance at about 550 nm wavelength of light), or layers of $MgF_2$ having a thickness of, for example, 80 nm (having a minimum of reflectance at about 450 nm). A further example is a layer of $SiO_2$ having a thickness of 70 nm, which has a minimum of reflectance at about 425 nm.

The above-mentioned anti-reflection layers are preferably deposited by vapor evaporation techniques and sputtering techniques. The layer thickness is preferably controlled by process parameters, like temperature or voltage and deposition time. Anti-reflection layers are preferably positioned on the outside pointing side of one of the substrates of the device.

Low refractive index materials from which the above-mentioned layers are preferably made are $MgF_2$, porous $SiO_2$, and fluorinated polymers.

Reflection layers can be made by adding to the above-mentioned anti-reflection layers one or more highly transparent thin layers which comprise materials with high refractive index. Preferred embodiments of such high refractive index materials are metal oxides, such as zinc oxide (ZnO) or titanium oxide ($TiO_2$). By doing so, layers which are highly reflective at certain wavelengths, and highly anti-reflective at other wavelengths can be obtained.

An example of such a reflection layer is a three-layer sequence, consisting of a 70 nm thick layer of $TiO_2$, followed by a 70 nm thick layer of $SiO_2$, followed by a 70 nm thick layer of $TiO_2$. Such a reflection layer is highly reflective at wavelengths between 550 nm and 850 nm, and highly anti-reflective at wavelengths between 400 nm and 500 nm.

As a further example, a seven-layer sequence T-M-T-M-T-M-T, where T is a 40 nm thin layer of $TiO_2$, and M is a 45 nm thin layer of $MgF_2$, is highly reflective at wavelengths of 380 to 500 nm, thus highly reflective in the blue part of the VIS spectrum.

It is noted that the above embodiments of reflection layers and anti-reflection layers serve only as examples and are not limitative to the present invention. The skilled person is well aware of the different types of reflection layers and anti-reflection layers which are presently known in the art, and can select from these as desired, in order to work the presently described invention.

For achieving color neutrality for light transmitted through the switchable optical device for at least one state of the at least one switchable layer, the at least one switchable layer comprises at least one dye. The absorption spectrum of the dye is preferably chosen such that it is complementary to the reflection spectrum of the at least one optical layer for visible light. As most reflectivity occurs within the at least one reflection band, the reflection spectrum is in good approximation defined by the at least one reflection band. The dye is preferably a dichroic dye.

For the purposes of the present application, the term "dichroic dye" is taken to mean a light-absorbent compound where the absorption properties are dependent on the orientation of the molecules relative to the direction of polarisation of the light. A dichroic dye in accordance with the present application typically has an elongate shape, i.e. the dye molecules are significantly longer in one spatial direction (longitudinal axis) than in the other two spatial directions.

The switchable layer according to the invention preferably comprises 2, 3, 4 or 5, particularly preferably 3 dichroic dyes, where the absorption spectra of the dichroic dyes preferably complement one another in such a way that the impression of a neutral black or grey colour arises for the human eye.

The dye compounds are preferably selected from azo compounds, anthraquinones, methine compounds, azomethine compounds, merocyanine compounds, naphthoquinones, tetrazines, rylenes, benzothiadiazoles, pyrromethenes, diketopyrrolopyrroles, thienothiadiazoles and malononitriles. Of these, particular preference is given to azo compounds, anthraquinones, rylenes, in particular as disclosed in WO 2014/090373, benzothiadiazoles, in particular as disclosed in WO 2014/187529, diketopyrrolopyrroles, in particular as disclosed in WO 2015/090497, thienothiadiazoles, in particular as disclosed in WO 2016/029996, and malononitriles, in particular as disclosed in WO 2016/091345.

Color neutrality can be determined by comparing the transmission spectrum of the switchable optical device to the spectrum of a reference light source. The color rendering index (CRI) may use a standard daylight spectrum such as D65 as reference. For the transmission through the switchable optical device to be considered color neutral, the color rendering index measured is preferably at least 80. The color rendering index is, for example determined according to CIE 13.3-1995. Furthermore, RGB color coordinates can be used to determine color neutrality of the light transmitted through the switchable optical device.

The layer structure of the switchable optical element preferably comprises in this order a first transparent substrate, a first transparent electrode layer, the switchable layer, a second transparent electrode layer and a second transparent substrate.

The transparent substrates may be a polymer or a glass pane. Each of the substrates is provided on one side with a transparent electrode. The transparent electrode is, for example, based on a thin layer of indium tin oxide (ITO). The two substrates are arranged such that the transparent electrodes face each other and such that a cell gap is formed between the two substrates. The cell gap between is between 2 µm and 200 µm wide. The switchable layer is located inside the cell gap. The switchable layer comprises at least one liquid-crystalline material and at least one dye. Preferably, the dye is a dichroic dye. The molecules of the liquid-crystalline material have properties of a liquid crystal and their orientation may be influenced by applying an electric field. Such an electric field can be generated by applying a driving voltage between the two transparent electrodes.

The switchable optical device may comprise more than one of such layer structures and thus the switchable optical device may comprise more than one switchable layer.

Preferably, the at least one optical layer is formed by coating the side of one or both of the transparent substrates which is not covered by the transparent electrode.

Alternatively or additionally it is preferred to apply the at least one optical layer to one or more transparent sheet(s) which is/are then laminated with one of the transparent substrates.

The switchable optical device preferably comprises two or more optical layers. For example, the switchable optical device may comprise, in addition to the one or more reflective layers, one or more anti-reflection layers.

The layer structure may further comprise one or more optically transparent alignment layers. The alignment layers provide a guide for the molecules to align in a preferred direction. Such an alignment layer may be formed by coating a transparent electrode with a polymer film that undergoes a rubbing process by which a series of parallel microscopic grooves is formed. A suitable alignment layer may be obtained by coating a transparent electrode with a polyimide layer and then rubbing the polyimide layer. The alignment layer is thus placed between one of the transparent electrodes and the switchable layer.

When two alignment layers are used, one arranged on each side of the switchable layer, the preferred directions of alignment of the alignment layers may be rotated with respect to each other, resulting in a twisted nematic configuration of the liquid-crystalline material. Further preferred configurations include super twisted nematic configuration and anti-parallel configuration.

Typically, the liquid-crystalline material and/or the at least one dye are dichroic and light of different polarization states experiences a different absorption coefficient. In order to further enhance the contrast C of the switchable optical device, the reflection of the at least one optical layer is polarization dependent wherein for wavelength within the at least one reflection band light of a first polarization is reflected stronger than light of a second polarization. Preferably, the at least one optical layer and the switchable layer are constructed and arranged such that the at least one optical layer has a stronger reflection for the light polarization which experiences less absorption in the liquid-crystalline material and/or in the at least one dye. By use of such an arrangement, the difference between the transmission in the bright state $T_B$ and the transmission in the dark state $T_D$ is increased.

The dichroic contrast D of the at least one switchable layer is defined as $$D=I_1/I_2$$

wherein $I_1$ is the intensity of transmitted light of a first polarization and $I_2$ is the intensity of transmitted light of a second polarization which is orthogonal to the first polarization direction. The first polarization is defined as the polarization for which the intensity of transmission is greater. Preferably, the dichroic contrast D is at least 2, more preferably at least 4 and most preferred at least 10 for light in the visible range of the spectrum.

The polarization contrast P of the optical layer is defined as $$P=R_1/R_2$$

wherein $R_1$ is the intensity of reflected light of a first polarization and $R_2$ is the intensity of reflected light of a second polarization direction which is orthogonal to the first polarization. The first polarization is defined as the polarization for which the intensity of reflection is greater. Preferably, the polarization contrast P is at least 2, more preferably at least 4 and most preferred at least 10 for light having a wavelength within the at least one reflection band.

Preferably, the reflection of the at least one optical layer is polarization dependent wherein light of a first linear polarization is reflected stronger than light of a second linear polarization. The second linear polarization corresponds to the linear polarization which experiences stronger absorption in the liquid-crystalline material and/or in the at least one dye.

Preferably, the reflection of the at least one optical layer is polarization dependent, wherein light of a first circular polarization is reflected stronger than light of a second circular polarization. Preferably, the at least one optical layer comprises a cholesteric layer, the reflection of light in the at least one reflection band being polarization dependent, wherein light of a first circular polarization is reflected stronger than light of a second circular polarization. The cholesteric layer is preferably a cholesteric liquid crystal layer.

Preferably, the cholesteric liquid crystal layer is arranged in a layer structure with a quarter wave retarder layer such that the switchable layer is located on one side of the quarter wave retarder and the at cholesteric liquid crystal layer is located on the other side of the quarter wave retarder. Preferably, both the quarter wave retarder and the reflection layer are arranged on the outer side (on which the light is incident). The quarter wave retarder is arranged in between the cholesteric liquid crystal layer and the switchable layer such that the transmitted second circular polarization is changed to a linear polarization corresponding to the linear polarization which experiences stronger absorption in the liquid-crystalline material and/or in the at least one dye. Preferably, the resulting linear polarization should then be parallel or perpendicular to the rubbing direction of the adjacent substrate if the substrate is provided with an alignment layer.

Preferably, the at least one optical layer comprises two cholesteric layers with a half wave plate arranged in between. By means of such a three-layer structure polarization independence is achieved.

The switchable optical device may comprise further wave retarders such as quarter wave retarders and/or half wave retarders to adjust the polarization of the light.

Preferably the switchable optical device can be used for windows, vehicles, buildings, greenhouses, eyeglasses, safety glass, optical instruments, sound barriers and/or medical instruments.

It is thus a further aspect of the invention to provide a switchable window which comprises at least one of the described optical devices. The switchable window may include further elements, such as a further glass pane to form an insulated window unit.

Figure 1:
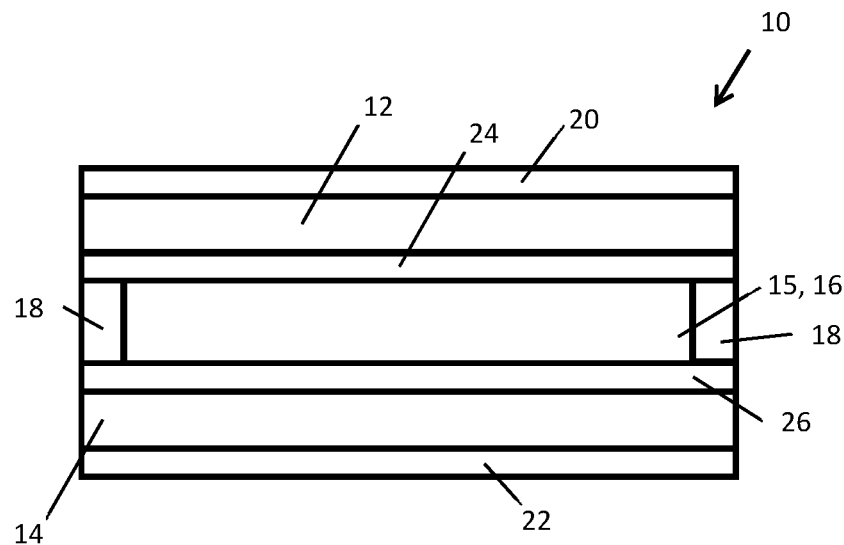
FIG. 1 shows an example of an inventive optical device in a schematic cross section view. The switchable optical device 10 comprises a first substrate 12 and a second substrate 14 which are arranged in parallel such that a cell gap is formed between the two substrates 12, 14. The cell gap is between 2 µm and 200 µm wide. A switchable layer 15 in form of a liquid crystalline medium 16 is arranged inside the cell gap and the cell is closed by means of a seal 18.

The substrates 12, 14 are transparent and the material of each of the substrates 12, 14 may be a polymer or a glass pane. Each of the substrates 12, 14 is provided on one side with a transparent electrode 24, 26. The transparent electrode 24, 26 is, for example, based on a thin layer of indium tin oxide (ITO). The two substrates 12, 14 are arranged such that the transparent electrodes 24, 26 face each other.

The liquid crystalline medium 16 comprises at least one liquid-crystalline material and at least one dye.

The side of the first substrate 12 which faces away from the liquid crystalline medium 16 is coated with an optical layer which is configured as a reflection layer 20. Likewise, the side of the second substrate 14 which faces away from the liquid crystalline medium 16 is coated with an optical layer which is configured as an anti-reflection layer 22. Thus, the switchable optical device 10 has a layer structure comprising in this order the reflection layer 20, the first substrate 12, a first electrode layer 24, the liquid crystalline medium 16, a second electrode layer 26, the second substrate 14 and the anti-reflection layer 22.

Figure 2:
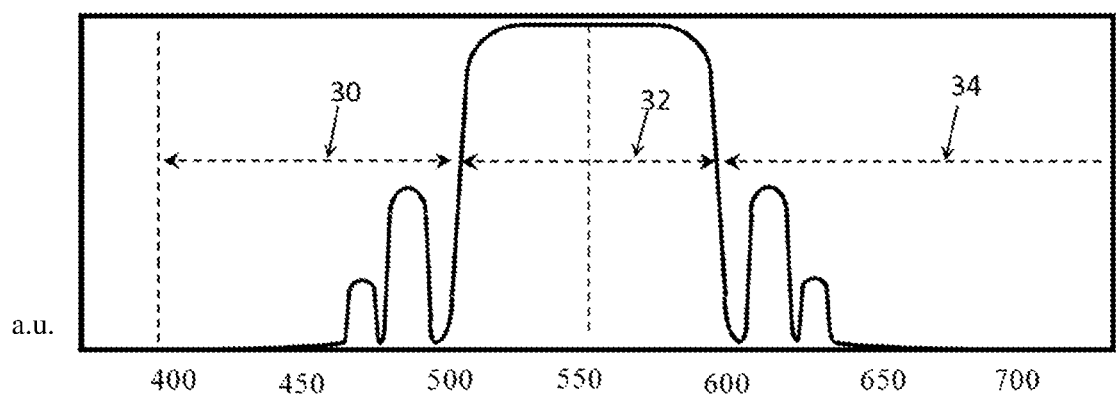

FIG. 2 shows a sketch of the strength of reflection of an optical layer of the switchable optical device 10 versus the wavelength of the light. The strength of reflection in % is defined as the ratio of the intensity of reflected light and the intensity of the incident light, wherein the angle of incidence, which is measured against the normal of the plane is 0°. It is given on the y axis in arbitrary units (a.u.). In FIG. 2, a first transmission band 30, a reflection band 32 and a second transmission band 34 are visible. The reflection band 32, in which the strength of reflection is increased compared to the average strength of reflection, is from about 500 nm to about 600 nm.

Figure 3:
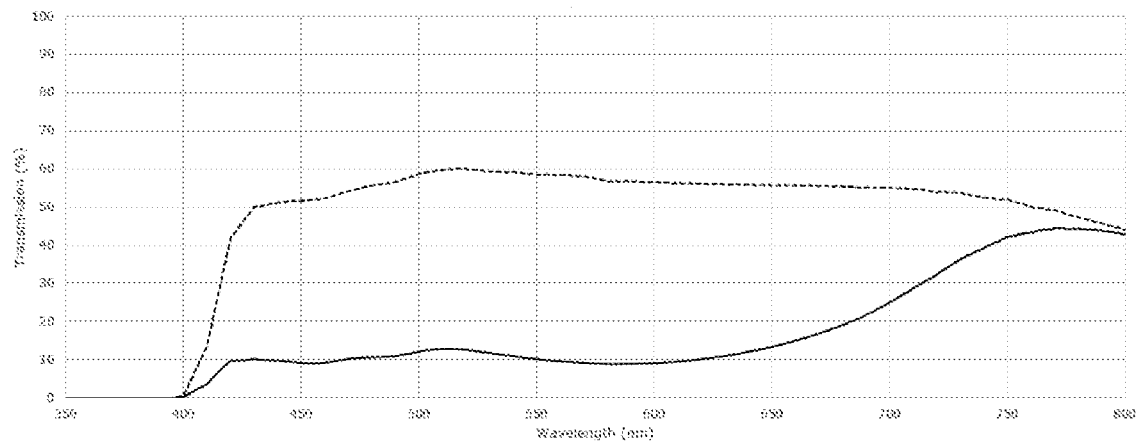

FIG. 3 shows the transmission spectrum of a standard dye doped liquid crystal mixture, both in the bright state (broken line) and in the dark state (normal line).

Figure 4:
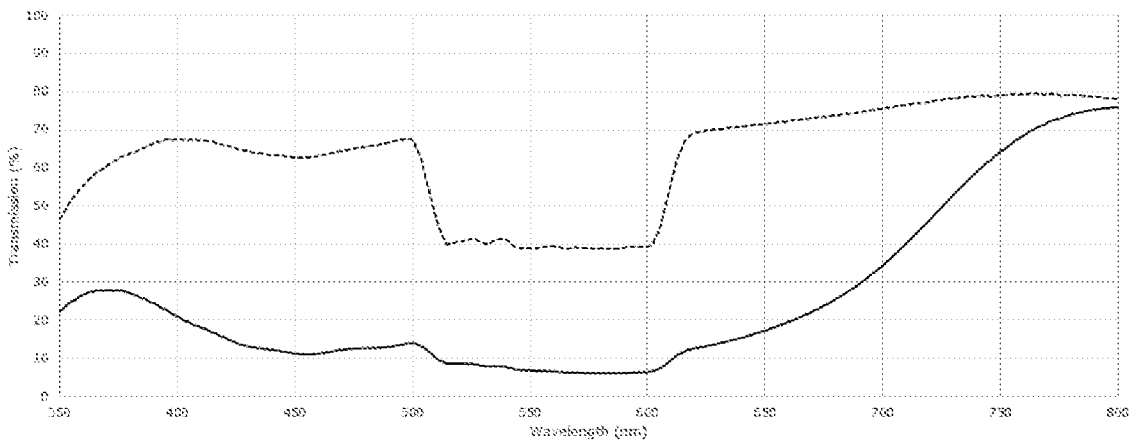

FIG. 4 shows the transmission spectrum of the device of Example 1A, both in the bright state (broken line) and in the dark state (normal line).

Figure 5:
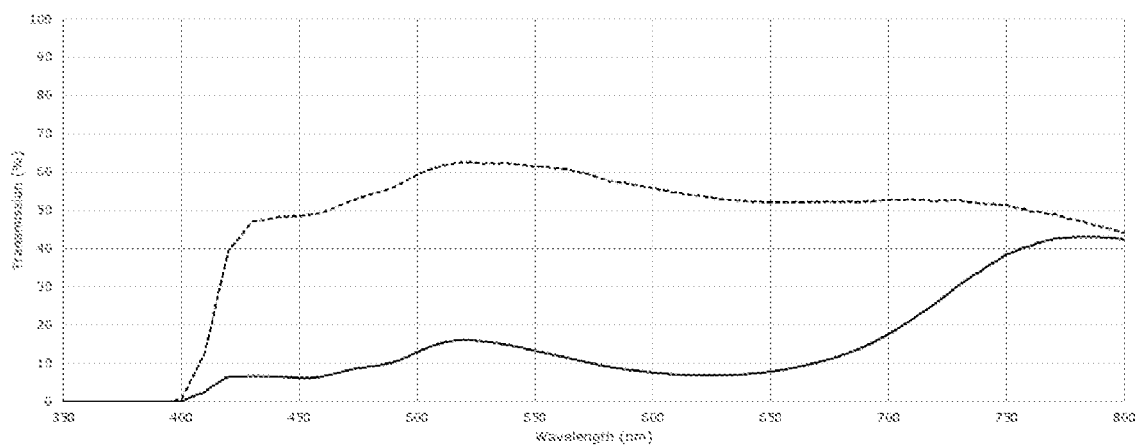

FIG. 5 shows the transmission spectrum of an absorption-adapted dye doped liquid crystal mixture, both in the bright state (broken line) and in the dark state (normal line).

Figure 6:
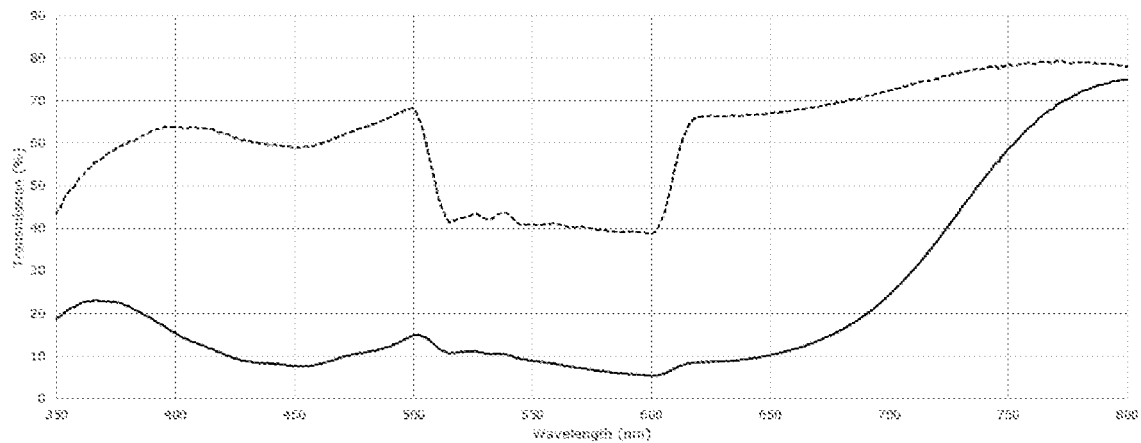

FIG. 6 shows the transmission spectrum of the device of Example 1B, both in the bright state (broken line) and in the dark state (normal line).

FIGS. 7-11 show transmission spectra of devices of the invention.

EXAMPLES

Example 1A

To produce a switchable window with a green outside appearance, two types of coated glass substrates are obtained from a major glass supplier. The first substrate is coated on one side with a selective reflection coating having a strength of reflection of 50%. The other side is coated with a transparent conductive oxide (TOO). In order to obtain a green appearance, the selective reflection coating is specified to have a central wavelength of approximately 550 nm and a bandwidth of approximately 100 nm. The second substrate has a TCO coating on one side and no coating on the other side.

After washing the substrates, polyimide is printed on the TCO coated side of both substrates. The substrates are then baked in an oven and the polyimide is rubbed to obtain alignment layers. Subsequently, the substrates are arranged as a cell (alignment layers facing inside) and filled with a standard dye doped liquid crystal mixture to obtain a switchable panel (25 µm cell gap, twisted nematic configuration). The transmission spectrum of the standard dye doped liquid crystal mixture is shown in FIG. 3. It has a quite constant absorption in the dark state between 420 nm and 650 nm.

The transmission spectrum of the device is recorded in the dark state (FIG. 4; broken line bright state, normal line dark state). It has a violet appearance to the eye in the dark state and has the following color coordinates in the dark state:

TABLE 1

| Example | (L*; a*; b*) | CRI |
|---|---|---|
| 1A (dark state) | (34.9; 10.506; −11.605) | 59.2 |

These results show that the dark state of the device according to this example is strongly colored.

Example 1B

A device is constructed which differs from the device of Example 1 A in that the absorption spectrum of the dye doped liquid crystal mixture is adjusted to be complementary to the reflection spectrum of the selective reflection coating (i.e. more absorbing in the blue and red parts of the visible spectrum). The transmission spectrum of this mixture is shown in FIG. 5. In all other aspects, the device is identical to the device of Example 1A.

The transmission spectrum of the device is recorded in the dark state (FIG. 6; broken line bright state, normal line dark state). It has a gray, color-neutral appearance to the eye in its dark state and has the following color coordinates in the dark state:

TABLE 2

| Example | (L*; a*; b*) | CRI |
|---|---|---|
| 1B (dark state) | (35.8; −8.550; −0.886) | 89.2 |

These results show that the dark state of the device according to this example is colored to a much lesser extent than the dark state of the device according to Example 1A.

Examples 2A, 2B and 2C

Figure 7:
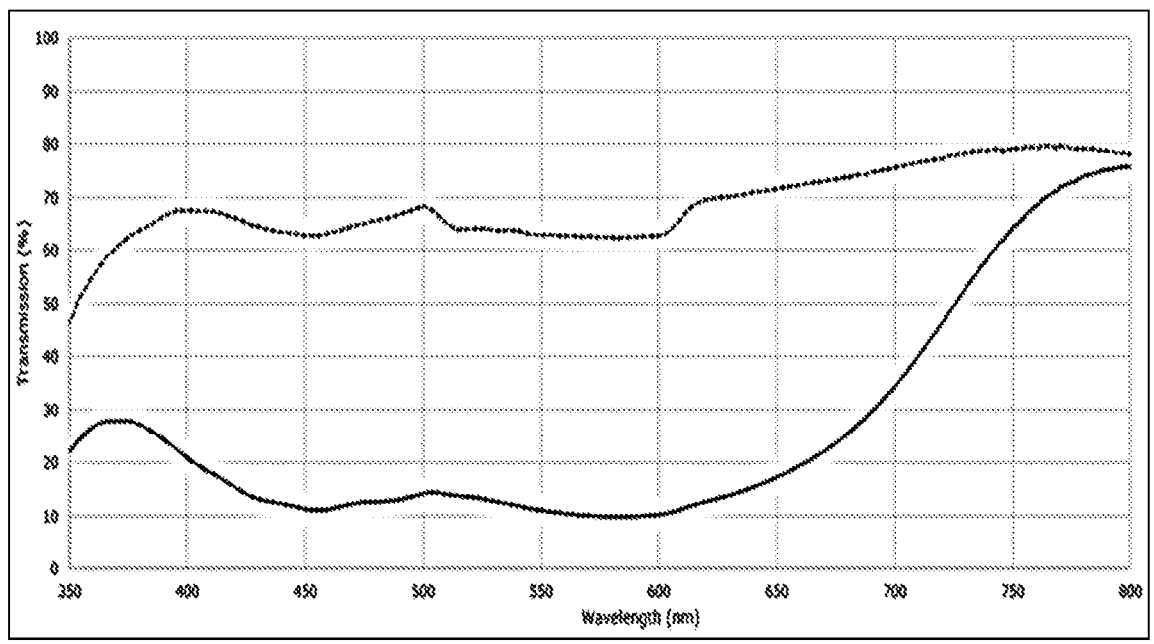

As an alternative example, switchable devices can be constructed, in which the reflective layer has a strength of reflection of 10%, not 50% as in Examples 1 A and 1B shown above. In such case, the comparative example (2A) is identical in all aspects to Example 1A, with the exception of the strength of reflection of the reflective layer, which is 10%, not 50% as in Example 1A. For Example 2A, a transmission spectrum as shown in FIG. 7 is obtained (broken line=bright state; solid line=dark state). The device shows coloration in the dark state, as can be seen from the CRI coordinates given in Table 3:

TABLE 3

| Example | (L*; a*; b*) | CRI |
|---|---|---|
| 2A (dark state) | (40.7; 0.854; −1.866) | 85.5 |

Figure 9:
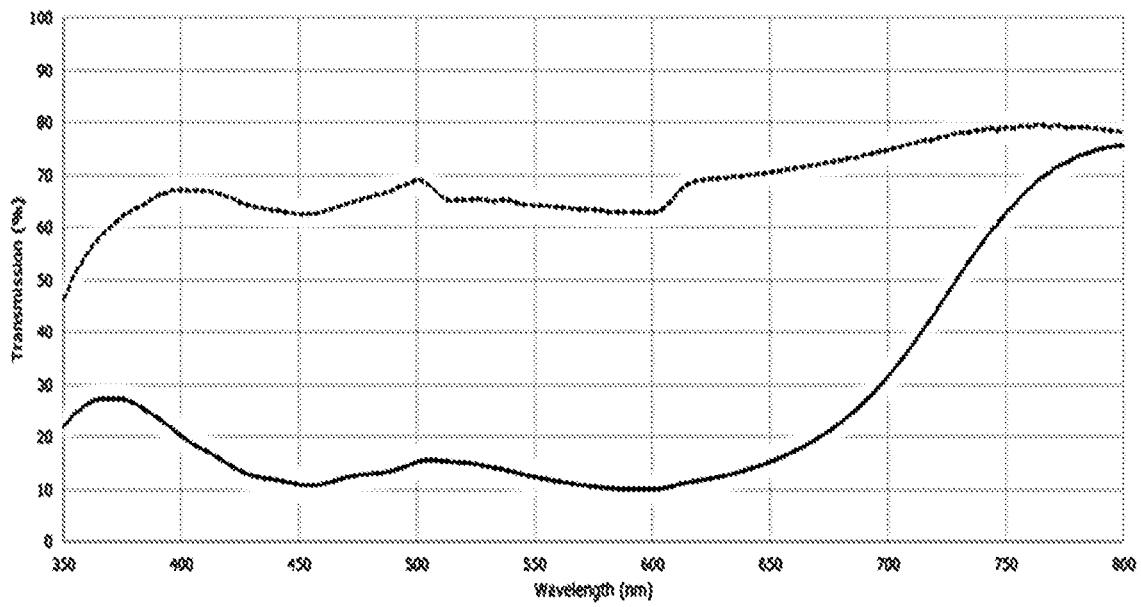

In contrast, with a device which has an adjusted LC mixture (Example 2B), the coloration of the dark state is much reduced. The transmission spectrum of this device is shown in FIG. 9 (broken line=bright state; solid line=dark state). The CRI color coordinates are given in Table 4:

TABLE 4

| Example | (L*; a*; b*) | CRI |
|---|---|---|
| 2B (dark state) | (41,9; −4.793; 0.516) | 93.4 |

Figure 8:
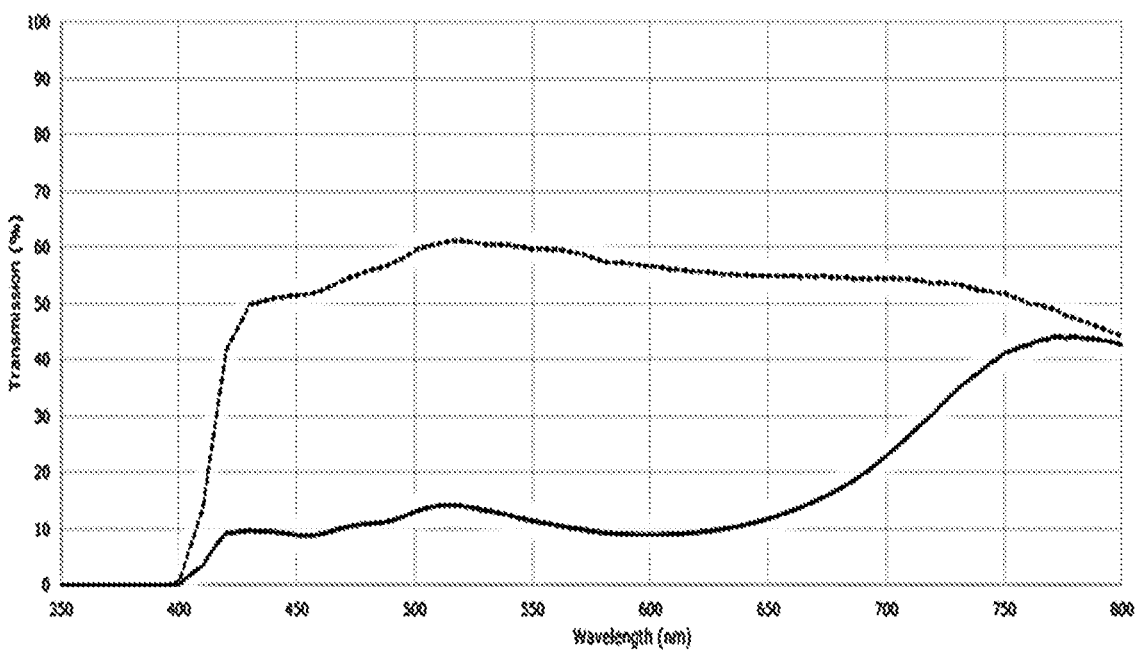

The transmission spectrum of the adjusted LC mixture which is used in this example 2B is shown in FIG. 8 (broken line=bright state; solid line=dark state).

The examples 2A and 2B show that also with a reflective layer having a strength of reflection of 10%, very good color neutrality of the dark state can be obtained for the device having the adjusted dye doped LC mixture.

Figure 10:
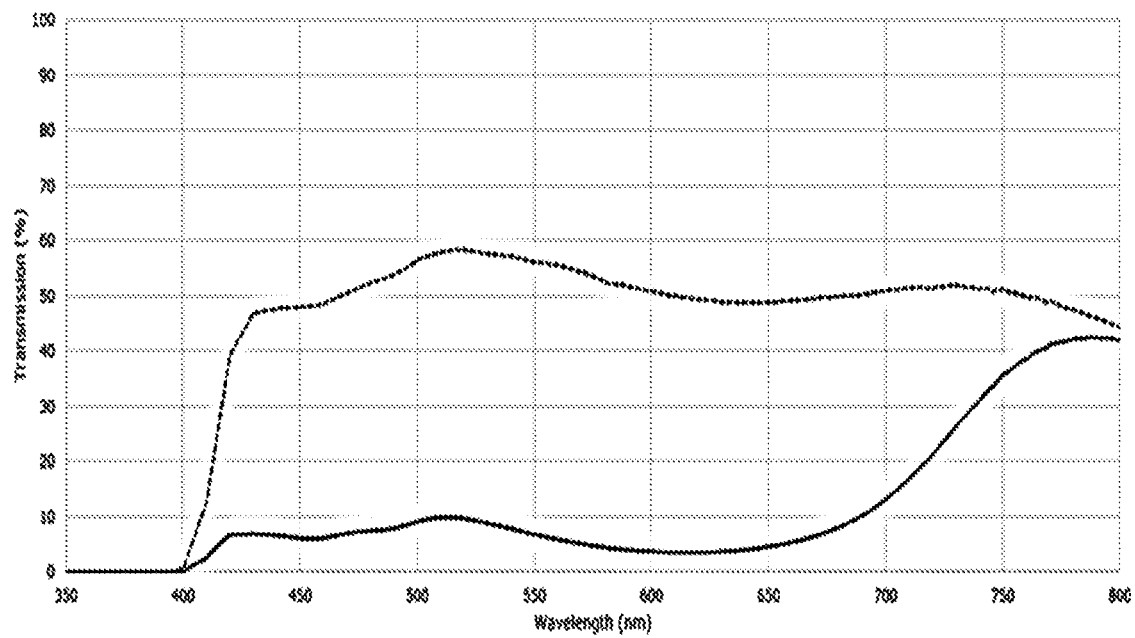
Figure 11:
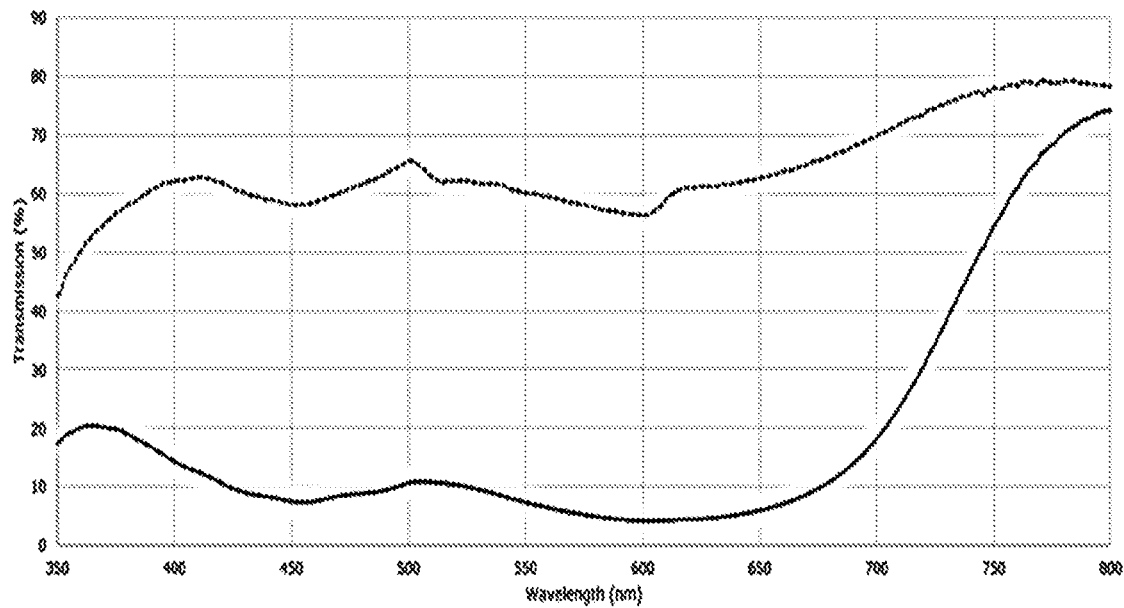

For example 2A, also for the bright state, an optimization of the color neutrality can be done. This is shown in example 2C, which is identical to example 2B, with the only exception that a different optimized LC mixture is used. The transmission spectrum of this example 2C is shown in FIG. 11, and the transmission spectrum of the optimized LC mixture used in this example 2C is shown in FIG. 10 (in both cases: broken line=bright state; solid line=dark state). The results show that the bright state of Example 2C is significantly less colored than the bright state of Example 2A. This can be seen from the CRI color coordinates for the bright state of Examples 2A and 2B shown in the table below:

TABLE 5

| Example | (L*; a*; b*) | CRI |
|---|---|---|
| 2A (bright state) | (84.1; 1.643; 0.085) | 95.1 |
| 2C (bright state) | (81.9; −2.119; 0.367) | 98.3 |

As an alternative example, a switchable device similar to the one described in Examples 1B or 2B or 2C can be constructed, in which the reflective layer is a cholesteric reflector, having a bandwidth of approximately 100 nm and a central wavelength of 550 nm, which is positioned on the outside pointing side of one of the substrates of the device, on the side of the device on which the light source is present. For such alternative example, comparable results can be obtained for the color neutrality of the transmission and for the color of the outside appearance of the device, as for Examples 1B and 2B and 2C.

As a further alternative example for which comparable results can be obtained for the color neutrality of the transmission and for the color of the outside appearance of the device as shown in the above examples, a device can be constructed which has an anti-reflection layer on the outside of the substrate which does not have the reflective layer.

As a further alternative example for which comparable results can be obtained for the color neutrality of the transmission and for the color of the outside appearance of the device as shown in the above examples, a device can be constructed which has in addition to the one switchable panel a second switchable panel. This second switchable panel comprises two substrates having a broadband anti-reflection layer, and a switchable layer comprising a standard dye doped liquid crystal mixture. Both switchable panels are combined into a double glazing unit. The selective reflection coating is facing outside, to the side of the external light source, so that the device appears green when viewed from the outside.

The invention claimed is:
1. A switchable window, comprising in said switchable window at least one switchable optical device (10) having a layer structure comprising at least one switchable layer (15)

and at least one optical layer (20, 22), wherein the at least one switchable layer (15) comprises a liquid-crystalline material and at least one dye, chosen such that the transmission spectrum of the switchable optical device (10) is color neutral for the visible light spectrum for at least one of the states of the at least one switchable layer (15), and the absorption spectrum of the at least one dye is complementary to the at least one transmission band of the at least one optical layer (20, 22) in order to obtain the color neutral transmission spectrum, the at least one optical layer (20, 22) having at least one reflection band (32) which includes at least a first part of the visible spectrum and has at least one transmission band (30, 34) which includes at least a second part of the visible spectrum and that the absorption spectrum of the at least one switchable layer (15) is, due to the at least one dye, such that the light transmission through the switchable optical device (10) for incident light in the visible spectrum for at least one of the states of the switchable layer (15) has a predetermined transmission spectrum, with at least 5% of light having a wavelength within the at least one reflective band being reflected by the at least one optical layer (20, 22).

2. The switchable window comprising the optical device (10) according to claim 1, wherein the at least one switchable layer (15) comprises at least a bright state and a dark state, wherein for light in the visible spectrum the contrast C defined by $C(\lambda)=(1-R(\lambda))\cdot(T_B(\lambda)\ T_D(\lambda))$ averaged over the visible spectrum is at least 0.5, wherein R is the intensity of light reflected by the switchable optical device (10), $T_B$ is the intensity of light transmitted through the switchable optical device (10) in the bright state and $T_D$ is the intensity of the light transmitted through the switchable optical device (10) in the dark state.

3. The switchable window comprising the optical device (10) according to claim 1, wherein the layer structure comprises in this order a first transparent substrate (12), a first transparent electrode layer (24), the at least one switchable layer (15), a second transparent electrode layer (26) and a second transparent substrate (14).

4. The switchable window comprising the optical device (10) according to claim 1, wherein the reflection of the at least one optical layer (20, 22) in the at least one reflection band is polarization dependent wherein light of a first linear polarization is reflected stronger than light of a second linear polarization.

5. The switchable window comprising the optical device (10) according to claim 4, wherein the polarization contrast of the at least one optical layer (20, 22) in the at least one reflection band defined as the ratio of the intensity of reflected light of the first polarization and the intensity of reflected light of the second polarization is at least 2.

6. The switchable window comprising the optical device (10) according to claim 4, wherein the at least one switchable layer (15) has a dichroic contrast defined as the ratio of the intensity of transmitted light of a first polarization and the intensity of transmitted light of a second polarization which is orthogonal to the first polarization of more than 2 for the visible spectrum in at least one state and wherein the polarization which is mostly transmitted by the at least one optical layer (20, 22) is in the same polarization for which the most absorption occurs in the at least one switchable layer (15).

7. The switchable window comprising the optical device (10) according to claim 1, wherein the at least one optical layer (20, 22) is a cholesteric layer, the reflection of light in the at least one reflection band being polarization dependent, wherein light of a first circular polarization is reflected stronger than light of a second circular polarization.

8. The switchable window comprising the optical device (10) according to claim 7, wherein the cholesteric layer and a quarter wave retarder layer are arranged on one side of the at least one switchable layer (15), the quarter wave retarder layer facing the at least one switchable layer (15), the quarter wave retarder changing the transmitted second circular polarization to a linear polarization.

9. The switchable window comprising the optical device (10) according to claim 1, wherein at least 90% of light having a wavelength within the at least one transmission band is transmitted by the at least one optical layer (20, 22).

10. The switchable window comprising the optical device (10) according to claim 1, wherein the switchable optical device (10) comprises at least two optical layers (20, 22).

11. The switchable window comprising the optical device (10) according to claim 1, wherein the at least one optical layer having at least one reflection band which includes at least a first part of the visible spectrum and having at least one transmission band which includes at least a second part of the visible spectrum, is a reflective layer.

12. The switchable window comprising the optical device (10) according to claim 1, as a window in a building or a vehicle.

\* \* \* \* \*